(12) United States Patent
Mottram et al.

(10) Patent No.: US 11,292,127 B2
(45) Date of Patent: Apr. 5, 2022

(54) ROBOT CONTROL

(71) Applicant: CMR Surgical Limited, Cambridge (GB)

(72) Inventors: Edward John Mottram, Cambridge (GB); Gordon Thomas Deane, Cambridge (GB); Edward Tucker, Cambridge (GB); Graham Veitch, Cambridge (GB); Paul Christopher Roberts, Cambridge (GB)

(73) Assignee: CMR Surgical Limited, Horsell (GB)

( * ) Notice: Subject to any disclaimer, the term of this patent is extended or adjusted under 35 U.S.C. 154(b) by 238 days.

(21) Appl. No.: 16/256,642

(22) Filed: Jan. 24, 2019

(65) Prior Publication Data

US 2019/0152056 A1 May 23, 2019

Related U.S. Application Data

(63) Continuation of application No. 15/466,984, filed on Mar. 23, 2017, now Pat. No. 10,232,510.

(30) Foreign Application Priority Data

Mar. 24, 2016 (GB) ...................... 1605108

(51) Int. Cl.
*B25J 9/00* (2006.01)
*B25J 9/16* (2006.01)
*B25J 13/08* (2006.01)

(52) U.S. Cl.
CPC .......... *B25J 9/1638* (2013.01); *B25J 9/1628* (2013.01); *B25J 9/1633* (2013.01); *B25J 13/085* (2013.01);

(Continued)

(58) Field of Classification Search
CPC ...... B25J 9/1638; B25J 9/1628; B25J 9/1633; B25J 13/05; G05B 2219/39338; G05B 2219/9342; G05B 2219/39346
See application file for complete search history.

(56) References Cited

U.S. PATENT DOCUMENTS 6,183,048 B1 * 2/2001 Takahira ................. B60T 7/122
                                                   303/113.1
9,221,177 B2   12/2015 Herr et al.
(Continued)

FOREIGN PATENT DOCUMENTS

CN        101432103 A    5/2009
CN        202716271 U    2/2013
(Continued)

OTHER PUBLICATIONS

JP2004-223663 Toru in view of English Translation (Year: 2004).*
(Continued)

*Primary Examiner* — Ian Jen
(74) *Attorney, Agent, or Firm* — Rothwell, Figg, Ernst & Manbeck, P.C.

(57) ABSTRACT

A method for controlling a mechanical system having a plurality of components interlinked by a plurality of driven joints, the method comprising: measuring torques or forces about or at the driven joints and forming a load signal representing the measured torques or forces; receiving a motion demand signal representing a desired state of the system; implementing an impedance control algorithm in dependence on the motion demand signal and the load signal to form a target signal indicating a target configuration for each of the driven joints; measuring the configuration of each of the driven joints and forming a state signal representing the measured configurations; and forming a set of drive signals for the joints by, for each joint, comparing the (Continued)

target configuration of that joint as indicated by the target signal to the measured configuration of that joint as indicated by the state signal.

21 Claims, 4 Drawing Sheets

(52) U.S. Cl.
CPC ............ *G05B 2219/37357* (2013.01); *G05B 2219/39188* (2013.01); *G05B 2219/39338* (2013.01); *G05B 2219/39342* (2013.01); *G05B 2219/39343* (2013.01); *G05B 2219/39346* (2013.01); *G05B 2219/39347* (2013.01); *G05B 2219/39348* (2013.01); *G05B 2219/39351* (2013.01); *G05B 2219/42016* (2013.01)

(56) References Cited

U.S. PATENT DOCUMENTS

| | | | |
|---|---|---|---|
| 9,814,605 | B2 | 11/2017 | Vitiella et al. |
| 9,821,456 | B2 | 11/2017 | Riedel |
| 9,883,815 | B2 | 2/2018 | Einarsson et al. |
| 2009/0105880 | A1 | 4/2009 | Okazaki |
| 2009/0171505 | A1* | 7/2009 | Okazaki ............... B25J 13/084 700/258 |
| 2011/0029133 | A1 | 2/2011 | Okazaki et al. |
| 2011/0208355 | A1 | 8/2011 | Tsusaka |
| 2012/0059515 | A1 | 3/2012 | Abdallah et al. |
| 2013/0151009 | A1 | 6/2013 | Okazaki |
| 2014/0081460 | A1 | 3/2014 | Ando et al. |
| 2014/0107843 | A1 | 4/2014 | Okazaki |
| 2014/0379126 | A1 | 12/2014 | Ueberle |
| 2015/0081098 | A1 | 3/2015 | Kogan |
| 2015/0231787 | A1 | 8/2015 | Inazumi |

FOREIGN PATENT DOCUMENTS

| | | |
|---|---|---|
| CN | 103118842 A | 5/2013 |
| CN | 104440913 A | 3/2015 |
| CN | 104626168 A | 5/2015 |
| JP | 3206765 B2 | 9/2001 |
| JP | 2008-302496 A | 12/2008 |

OTHER PUBLICATIONS

Variable and Parametere—MIT Open Course Ware Differential Equation (Year: NA).*
GB Search Report for GB Patent Appl. No. 1605108.8, dated May 31, 2016.
Patent Cooperation Treaty Application No. PCT/GB2017/050814, International Search Report and Written Opinion dated Jul. 25, 2017, 17 pages.
Communication pursuant to Article 94(3) EPC in EP application No. 17 714 533.1 dated Jul. 10, 2020, 9 pages.
Notification of Reason(s) for Refusal dated May 26, 2021 in JP Patent Application No. 2018-549939 with English translation (13 pages total).
Shigeki Toyama, Robotics Engineering, First Edition, Tokyo, Japan, Corona Corporation, Feb. 25, 1994 with partial English translation (5 pages total).
First Notification of Office Action issued in Chinese Application No. 201780019183.3, dated May 6, 2021, 27 pages, with an English language translation.
Summons to attend oral proceedings dated Oct. 28, 2021 in related European Patent Application No. 17714533.1 (12 pages total).

* cited by examiner

ROBOT CONTROL

RELATED APPLICATIONS

This application is a continuation of U.S. patent application Ser. No. 15/466,984, filed Mar. 23, 2017, titled "Robot Control," which claims priority to UK patent application number 1605108.8, titled "Robot Control," filed Mar. 24, 2016, the entirety of each of which is hereby incorporated by reference herein.

FIELD

This application relates to the control of drive systems for machines such as robot arms.

BACKGROUND

A typical robotic manipulator comprises a series of rigid elements which are coupled together by joints. The elements may be joined in series to form an arm. The joints can be driven so as to cause relative motion of the rigid elements. The rigid elements may stem from a base and terminate in an end effector. Thus motion at the joints can be used to position the end effector at a desired location. Each joint may provide rotational motion or linear motion. The joints may be driven by any suitable means, for example electric motors or hydraulic actuators.

When the robot is in operation it will be required to cause the end effector to move to some desired position. For example, the robot may be required to use the end effector to pick up an object. That would require the end effector to be moved to where the object is. To accomplish this, some combination of motions of the joints is required. Calculating those motions is the role of the robot's control system.

Conventionally the robot is provided with position sensors, each of which senses the configuration of a respective one of the joints. This position information is fed to the control system.

A well-known strategy for the control system is as follows:
1. Receive information indicating a desired position of the end effector.
2. Determine a set of target configurations of the joints of the robot that will result in the end effector being in that position. This is known as inverse kinematics.
3. Receive information indicating the current configuration of each joint in the robot, compare those current configurations to the target configurations and calculate a set of torques or forces required at each joint in order to reduce the error between the respective joint's current and target positions.
4. Send drive signals to the actuators in the robot in order to impose those torques or forces at the respective joints.

This series of steps is performed repetitively so that over time the motion of the robot conforms to the target configurations. Instead of, or in addition to, indicating a position of the end effector, the information input to the system could indicate a desired position of another part of the robot. This may apply if, for example, a robot arm is required to avoid an external obstruction near the mid-point of the arm.

An alternative approach is known as impedance control. Impedance control involves regulating the relationship between (i) torque/force and (ii) position, velocity and acceleration.

In certain applications, controlling the impedance of the end-effector is more advantageous than only controlling the position. For example, in an application where the end effector is required to insert a long rod (for example an endoscope) through a small aperture (e.g. a port), it is advantageous for the end effector to have a finite stiffness, so that slight misalignment between the port and endoscope can be accommodated.

Figure 1:
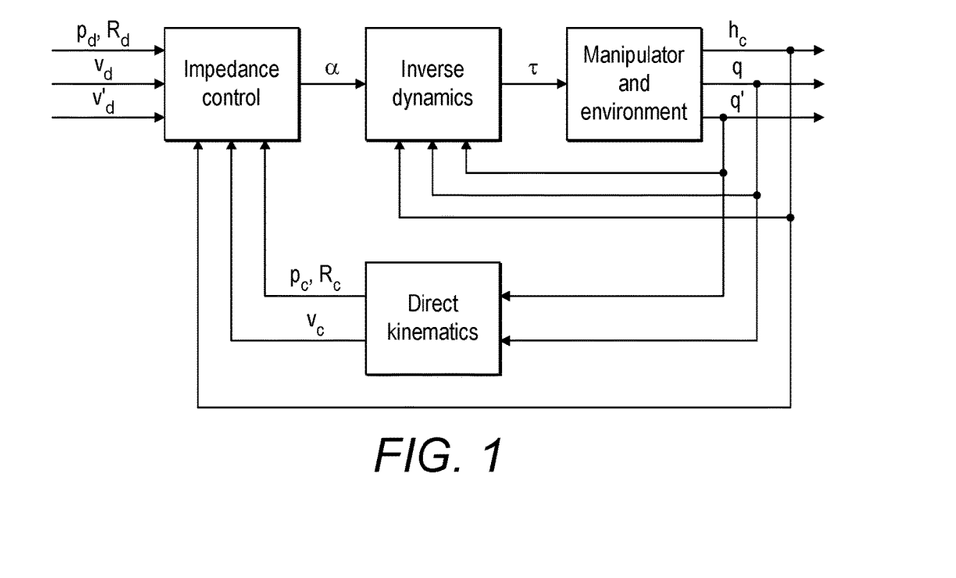
FIG. 1 is a block diagram of a prior art impedance control algorithm.

FIG. 1 illustrates one way of implementing impedance control for a robot manipulator. In this approach the following inputs are fed to an impedance control block:
- $p_d$ (a desired position vector), $R_d$ (a desired rotation matrix), $v_d$ (a desired velocity) and $V'_d$ (a desired acceleration) derived from a command source;
- $p_c$ (a position vector in a compliant frame), $R_c$ (a rotation matrix in a compliant frame) and $v_c$ (a velocity in a compliant frame) derived by forward kinematics in the direct kinematics block; and
- $h_c$ (measured end effector torque/force).

The impedance control block implements the impedance control model based on those inputs in order to generate a demanded acceleration ($\alpha$) in joint space. The demanded acceleration is expressed as the vector of $$\frac{d^2 q_d}{dt^2}$$

where $q_d$ is the commanded joint motion q. These are then moderated by an inverse dynamics block to generate a set of drive torques or forces T which are used to drive the robot manipulator. It is understood that in this approach impedance is synthesised at the end effector. This has the disadvantage that the contact torque/force ($h_c$) at the end effector should be measured, which may be difficult or even impossible in some situations: for example some surgical robotic applications, and involves additional cost and potentially unreliability. A further problem with this approach is that it relies on modelling inverse dynamics. This requires ongoing computation of the manipulator's accelerations and makes the control performance sensitive to the accuracy of the model of the robot manipulator, which may be inaccurate in its data for masses, inertias, losses and so on. A further problem is that the impedance control approach is sensitive to external disturbances that are outside the scope of the model, such as drive friction and unexpected physical obstacles. These will lead to position tracking errors.

Figure 2:
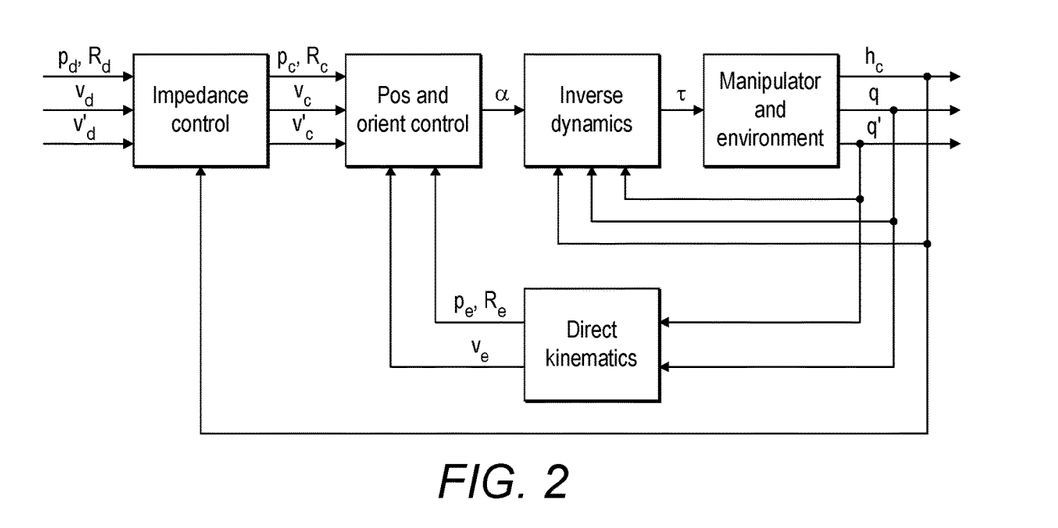
FIG. 2 is a block diagram of another prior art impedance control algorithm.

FIG. 2 shows a second way of implementing impedance control. In this approach an inner motion control loop is provided. The objective of this scheme is to make the manipulator stiff, so that it faithfully tracks a demanded position $p_c$ and rotation $R_c$ in a compliant frame as computed by the impedance control block. The commanded values $p_d$, $R_d$, $v_d$ and $v'_d$ are provided to the impedance control block together with the measured $h_c$. The impedance control block synthesises a desired mechanical impedance of the end effector by solving the second order dynamic equation:

$$K_M \Delta \dot{v}_{dc}{}^c + K_M \Delta v_{dc}{}^c + h_\Delta{}^c = h^c$$

for $v_{dc}$ and $v'_{dc}$. In this equation, $K_M$ represents a matrix of spring constants and $v_{dc}$ represents the difference in position between the demand reference frame and the compliant frame. The desired position, rotation, speed and acceleration in the compliant frame are passed to a position and orientation control block. That block is a controller which sets the tracking performance of the system based on the difference between the values determined from the impedance control block and the values determined by direct kinematics. The output of the position and orientation control block is a set of set of output torques or forces α, representing the demanded accelerations in joint space, which are processed as in the scheme of FIG. 1. The scheme of FIG. 2 may help to address the problems with position tracking in the scheme of FIG. 1, but it has a number of other disadvantages. First, impedance is computed in the end effector's Cartesian reference frame ($h_c$ represents force in x, y, z and torque in three rotational dimensions). In some applications it may be desirable to use other coordinate systems. Second, the system of FIG. 2 brings the inverse kinematics problem into the control of position and orientation. This is problematic because typically the inverse kinematics problem is considered hard to solve. One reason for this is that there can be multiple solutions (i.e. there can be multiple sets of joint angles which will give a particular end effector position). Another reason is that certain poses of the manipulator can become singular, meaning that it is impossible to make subsequent movements of the effector in all directions with finite joint velocities. For these reasons, embedding the inverse kinematics solution within the feedback loop makes it significantly harder to validate any potential failure cases of the algorithm as a whole. Finally, as with the system of FIG. 1, it is supposed that torque/force will be measured at the end effector, which may be impractical and can introduce additional cost and unreliability, as discussed above.

There is a need for an improved control system for mechanical systems such as robot manipulators.

SUMMARY

According to the present disclosure there is provided an example method for controlling a mechanical system having a plurality of components interlinked by a plurality of driven joints, the method comprising: measuring the torques or forces about or at the driven joints and forming a load signal representing the measured torques or forces; receiving a motion demand signal representing a desired state of the system; implementing an impedance control algorithm in dependence on the motion demand signal and the load signal to form a target signal indicating a target configuration for each of the driven joints; measuring the configuration of each of the driven joints and forming a state signal representing the measured configurations; and forming a set of drive signals for the joints by, for each joint, comparing the target configuration of that joint as indicated by the target signal to the measured configuration of that joint as indicated by the state signal.

The method may comprise driving each of the driven joints in dependence on the respective drive signal. Each of the driven joints may be provided with a respective electric motor for driving motion at the joint. Each drive signal may be applied to the respective electric motor.

The method may comprise repeatedly performing the second measuring step, the forming step and the driving step. The step of forming the set of drive signals may be performed at higher frequency than the step of forming the target signal.

The impedance control algorithm may be implemented in dependence on, for each driven joint, a respective mass, damper and spring term.

The motion demand signal may represents a desired configuration for each of the driven joints.

The method may comprise: receiving a primary motion demand signal representing a desired physical position of a part of the mechanical system; performing an inverse kinematic computation to determine a configuration for each of the driven joints that would position the part of the mechanical system at the desired physical position; and providing those configurations as the motion demand signal.

The method may comprise: receiving data representing desired impedance characteristics for the physical system in a first coordinate space; and converting that data to, for each driven joint, a respective mass, damper and spring term.

The first coordinate space may be a Cartesian, non-Cartesian, topological or vector space.

The impedance control algorithm may be implemented in joint space.

The motion demand signal may represent a desired physical position of a part of the mechanical system.

The said step of implementing the impedance control algorithm may comprises: implementing the impedance control algorithm to determine a target physical position of the part of the mechanical system; performing an inverse kinematic computation to determine a configuration for each of the driven joints that is suitable for positioning the part of the mechanical system at the target physical position; and forming the target signal as indicating those configurations as the target configurations for the driven joints.

The method may comprise: specifying additional information indicating a desired configuration of the mechanical system. The step of performing an inverse kinematic computation is performed so as to determine a configuration for each of the driven joints that is suitable for positioning the part of the mechanical system at the target physical position and satisfying the desired configuration specified by the additional information.

The method may comprise converting the measured torques or forces about or at the driven joints to a first coordinate space different from the space in which they were measured so as to form the load signal.

The first coordinate space may be a Cartesian space, non-Cartesian space, topological space or vector space.

The mechanical system may be a robot manipulator.

The mechanical system may be a surgical robot. The end effector of the surgical robot may be a surgical tool.

The mechanical system may be a master-slave manipulator. The motion demand signal may be formed by a master controller.

According to a second aspect of the disclosure there is provided a controller for a mechanical system, the controller being configured to perform a method as set out above.

According to a third aspect of the disclosure there is provided a robot manipulator having a plurality of components interlinked by a plurality of driven joints and a controller configured for controlling the manipulator by a method as set out above.

According to a fourth aspect of the disclosure there is provided a non-transitory computer readable storage medium having stored thereon computer readable instructions that, when executed at a computer system, cause the computer system to perform a method as set out above.

The said part may be an end effector or a part proximal of the end effector. The desired position of the part may be a defined by defining a unique position of the part or a permitted locus of the part.

The components may be rigid and/or elongate components. The joints may be rotational and/or linear joints.

DETAILED DESCRIPTION

Examples according to the present disclosure will now be described with reference to the accompanying drawings.

Figure 3:
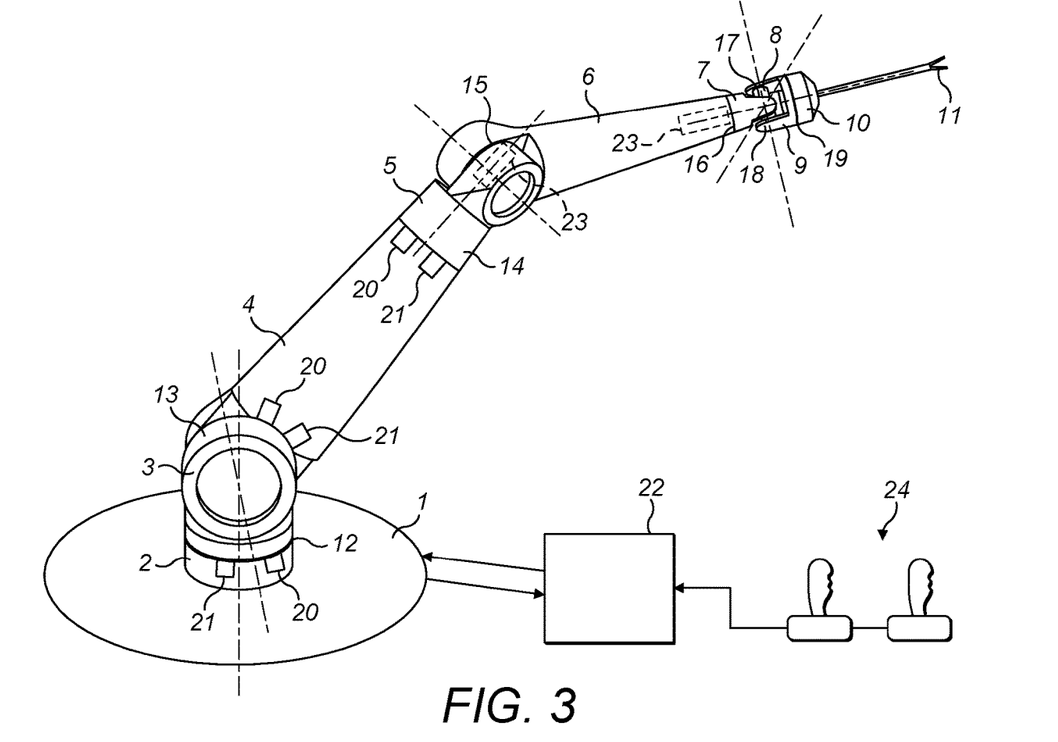
FIG. 3 illustrates an example robot arm.

FIG. 3 shows an example of a robot manipulator arm. The arm extends from a base 1, which can be fixed in position or may be movable, e.g. on a trolley. The arm is composed of a set of rigid elements 2-10, terminating in an end effector 11. The rigid arm elements are coupled together in series by reconfigurable joints 12-19. In this example the joints are all revolute joints but they could provide for linear motion. Each joint is provided with a respective position sensor 20 for sensing the positional configuration of the joint and a torque sensor 21 for sensing torque about the joint. Data from these sensors is fed to a control unit 22. An electric motor 23 is provided at each joint to drive relative rotation at the joint of the two arm elements that are interconnected by the joint. For clarity, only some of the sensors 20, 21 and the motors 23 are shown in FIG. 3. The electric motors are driven by signals from the control unit 22. The control unit could be a computer. The control unit receives input from a command device 24. That input represents a stimulus or demand for the manipulator to move in a particular way. The command device could for example sense physical command inputs from a user by which a user can signal desired motions of the arm. The command device could include one or more joysticks or other physically movable controllers, it could comprises sensors for contactlessly sensing motions of a user (e.g. using analysis of a video stream showing the user) or it could be a computer which automatically commands motion of the arm in accordance with a stored program. Such a command computer could be functionally and/or physically integrated with the control computer. The command device could be co-located with the control unit or remote from it. The control unit could be co-located with the robot manipulator or remote from it. Communication links are provided between the arm and the control unit and between the control unit and the command device. These could independently be wired and/or wireless links. Further information on an arm of this type is disclosed in WO 2015/132549.

Figure 4:
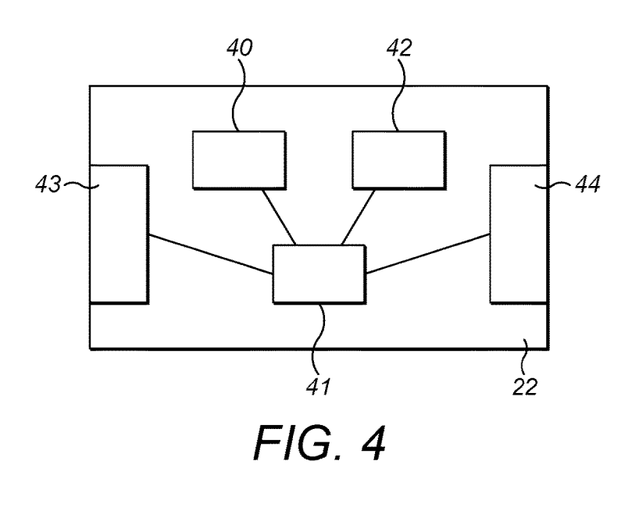
FIG. 4 shows an example architecture for a control unit.

The control unit 22 will typically be a computer; either in a single housing or distributed between multiple physical units and potentially between different locations. FIG. 4 shows an example architecture for the control unit. In this example the control unit comprises a memory 40 which non-transiently stores program code that is executable by a processor 41. A temporary memory 42 (e.g. RAM) is available for used by the processor. The processor is coupled to interfaces 43 and 44. Interface 43 interfaces to the sensors and motors of the arm. Interface 44 interfaces to the command device. The non-transient program code stored in memory 40 is arranged to cause the processor 41 to perform the functions required to implement the desired control algorithm, e.g. one of algorithms A and B as described further below. Alternatively, some or all of the functions of the control unit 22 could be implemented in dedicated hardware.

Two control algorithms, A and B, will be described below. In each algorithm a set of desired configurations ($q_d$) are computed for the joints of the arm. $q_d$ can be a vector specifying a configuration for each joint of the arm. The configurations may be angular and/or linear configurations, depending on the motion of each joint. The desired configurations are compared to the current configurations as sensed by the position sensors 20 of the arm. In dependence on the difference between each joint's desired configuration and its current configuration a joint space position controller computes a torque which when applied about the joint will tend to drive the joint towards the desired configuration. Each joint is then driven in accordance with the respective computed torque, preferably so as to apply substantially that computed torque about the joint.

An impedance model is used to calculate the desired joint configurations. The impedance model has inputs from an external stimulus, and design constraints which can be specified so as to achieve a desired impedance. The external stimulus could be a pre-programmed trajectory for the end effector or any part of the arm, or could be given by direct user input as in the case of a master-slave manipulator.

Figure 5:
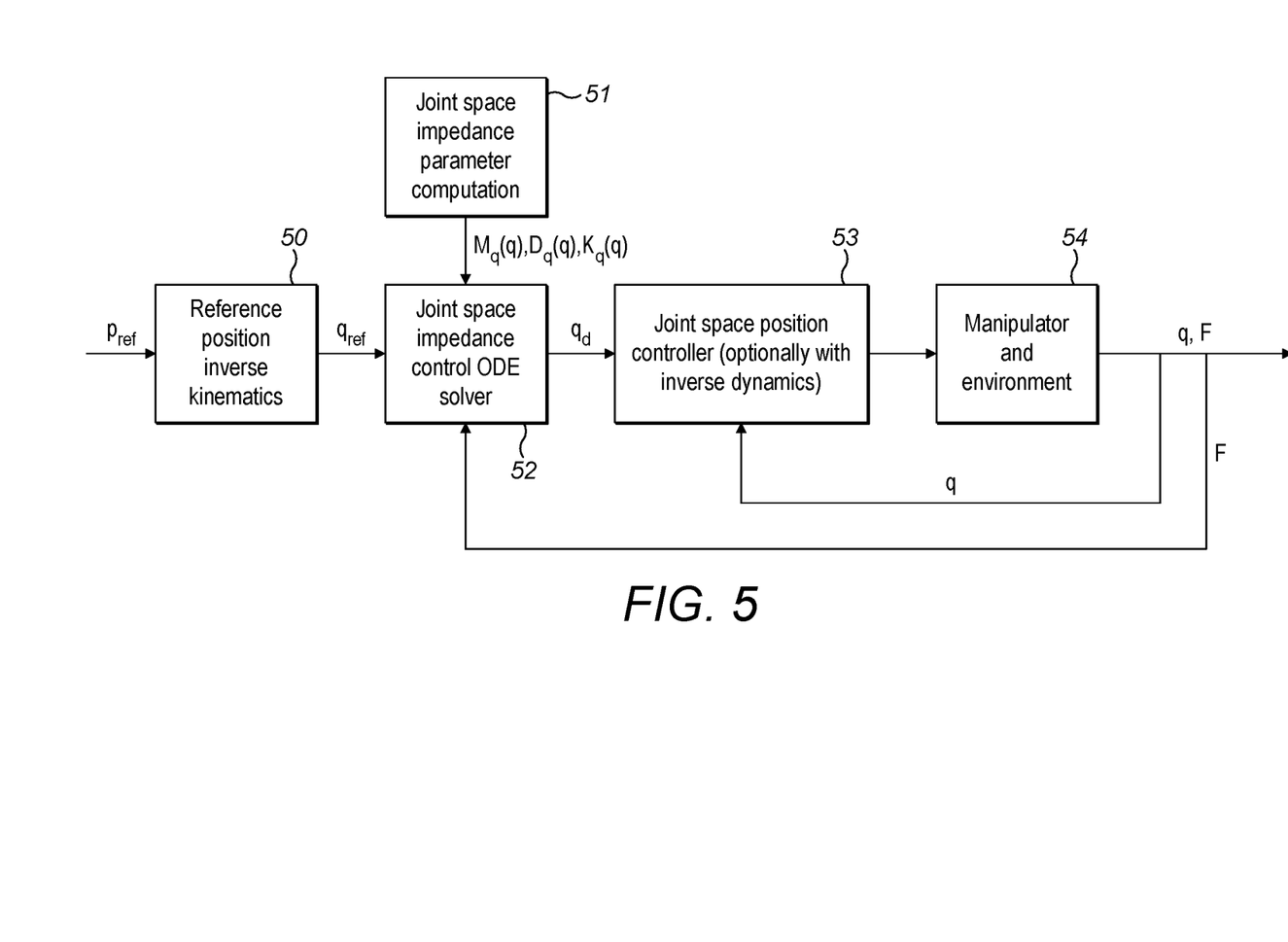
FIG. 5 is a block diagram of a first impedance control algorithm ("A").

The first control algorithm A will now be described with reference to FIG. 5.

The first control algorithm comprises the following functional blocks: a reference position inverse kinematics block 50, a joint space impedance parameter computation block 51, a joint space impedance control solver block 52 which may solve ordinary differential equations (ODEs), and a joint space position controller block 53. FIG. 5 also shows the manipulator and its environment as a block 54. Functional blocks 50 to 53 may be implemented in any suitable combination of hardware and/or software.

In the description below the term p represents a position in a suitable reference frame, which could be but is not necessarily a Cartesian reference frame. The term q represents a set of joint angles for joints 12-19 in the arm of FIG. 3. In other examples where one or more of the joints permits linear motion, q could represent linear configuration(s) of the joint(s).

In general terms, the first control algorithm operates in the following way.

A reference position $p_{ref}$, which represents the base position of the end effector 11 before it has been perturbed by exogenous forces, is input to the reference position inverse kinematics block 50. The reference position inverse kinematics block 50 performs inverse kinematics to derive a set of reference joint angles $q_{ref}$ corresponding to $p_{ref}$.

The joint space impedance parameter computation block 51 calculates a set of matrices $M_q(q)$, $D_q(q)$ and $K_q(q)$ which represent the appropriate mass, damper and spring terms respectively for the desired impedance behaviour of the manipulator.

$q_{ref}$, $M_q(q)$, $D_q(q)$ and $K_q(q)$ are input to the joint space impedance control solver block 52 together with the torques F sensed by the torque sensors 21 of the arm joints. That block processes the inputs in accordance with a relationship describing an impedance-based control system to form $q_d$, which is a set of demanded joint angles.

$q_d$ is input to the joint space position controller block 53 together with q, which represents the measured positions of the joints as derived from the position sensors 20. The joint space position controller block 53 forms a set of drive outputs to the motors 23 of the arm in dependence on the difference between the desired and actual configurations of the respective joint at which that motor acts. Each drive output represents a command torque to the respective motor. The drive outputs are passed to the motors 23 of the arm to cause them to apply corresponding torques/forces to the joints of the arm. The joint space position controller could be a proportional-differential controller, or another linear or non-linear control law (e.g. proportional-integral-derivative (PID), PID with inverse dynamics, PID with feedback linearization, stochastic control laws such as Kalman filters, LQG control, H-2 or H-infinity control laws, fuzzy logic control laws, model predictive control (MPC) laws aka dynamic matrix control laws.

One example of how this can be implemented mathematically is as follows.

Values are chosen for $M_q$, $D_q$, and $K_q$ to set the desired mass, damper and spring terms. A convenient approach is to choose a desired spring constant K and then choose M and D to make the system critically damped at a chosen frequency.

The joint space impedance control solver can solve the following equation for q:

$$M_q(q)\ddot{\tilde{q}} + D_q(q)\dot{\tilde{q}} + K_q(q)\tilde{q} = \tau_m$$

where $\tilde{q}$ denotes $q_{ref}$ and $\tau_m$ represents the set of measured torques at each joint. In order to solve this a standard approach may be used, for instance:

$$\ddot{\tilde{q}} = M_q(q)^{-1}[\tau_m - D_q(q)\dot{\tilde{q}} - K_q(q)\tilde{q}]$$

Such an equation can be solved with state variables $\dot{\tilde{q}}$ and $\tilde{q}$ using a time-step method.

In the general Cartesian case, $M_q$ and $D_q$ can be shown to be:

$$M_q = J(q)^T M_x J(q)$$

$$D_q = J(q)^T \{D_x J(q) + M_x j(q)\}$$

Where J indicates the Jacobian and $K_q(q)\tilde{q}$ is better calculated as $J(q)^T K_x \tilde{x}$.

In some situations, for example when the mechanical system is a redundant serial robot manipulator, $M_q(q)$ might be not a full rank matrix. In that case a number of approaches can be followed.

One approach is to use an ODE solver algorithm which does not require $M_q(q)^{-1}$ to be computed (for instance the Runge-Kutta method or the Bogacki-Shampine method).

Another approach is to choose a matrix T such $T^T M_q(q)T$ is invertable: for example with T being akin to the identity matrix but with specific columns removed; and then to solve not for q but for r, where r is defined such that Tr=q. This approach results in r being of reduced dimension relative to q. This approach can be advantageous when the system being controlled is a redundant manipulator when it may be desired for the impedance constraint only to apply to a certain subspace of the joint angles q. Furthermore T could be not constant, but instead may be parameterised on q. In this case, the subspace of q in the null space of T can be assigned directly.

It should be noted that in operation $M_q(q)$, $D_q(q)$ and $K_q(q)$ are not necessarily constant, and may need to be periodically updated. On the other hand, $M_x$, $D_q$ and $K_q$ may sensibly be chosen to be constant, although they could also vary over time.

In this first control algorithm A position control can be achieved either by ensuring that the dimensions to be controlled are in the null space of $T^T$, or by specifying a suitably stiff impedance for those dimensions.

The reference position inverse kinematics block can be omitted if the reference position is supplied in joint space.

The impedance parameters could be supplied in any suitable space, and converted into joint space. If they are supplied in joint space then the joint space impedance parameter computation block 51 could be omitted.

To illustrate this first control algorithm, consider the joint 14 of the robot arm of FIG. 3. Due to the redundant nature of the arm, for many poses of the arm it is possible to freely adjust joint 14 whilst keeping the terminal part 10 of the arm stationary in the world reference frame. When there is rotation at joint 14 the next-most-distal part of arm, 5, will move along a path. Suppose the designer wishes to specify a mechanical impedance for motion along this path. Adopting the notation that the matrices describing the behaviour of the arm treat the joints of the arm in turn starting from the most-proximal joint 12, and noting that joint 14 is the third joint from the proximal end of the arm, T can be set as:

$$T = \begin{bmatrix} 0 \\ 0 \\ 1 \\ 0 \\ 0 \\ 0 \\ 0 \\ 0 \end{bmatrix}$$

This will result in $M_q$, $D_q$ and $K_q$ all being scalar. The torque is given as $T^T \tau_m$, which is also scalar. Hence the ODE may be solved to give the component of $q_d$ for joint 14. That component of $q_d$ can then be combined with the other $q_d$ components computed from the reference inverse kinematics, and the resulting complete joint position vector can be supplied as a set of points into the joint space position controller 53.

Figure 6:
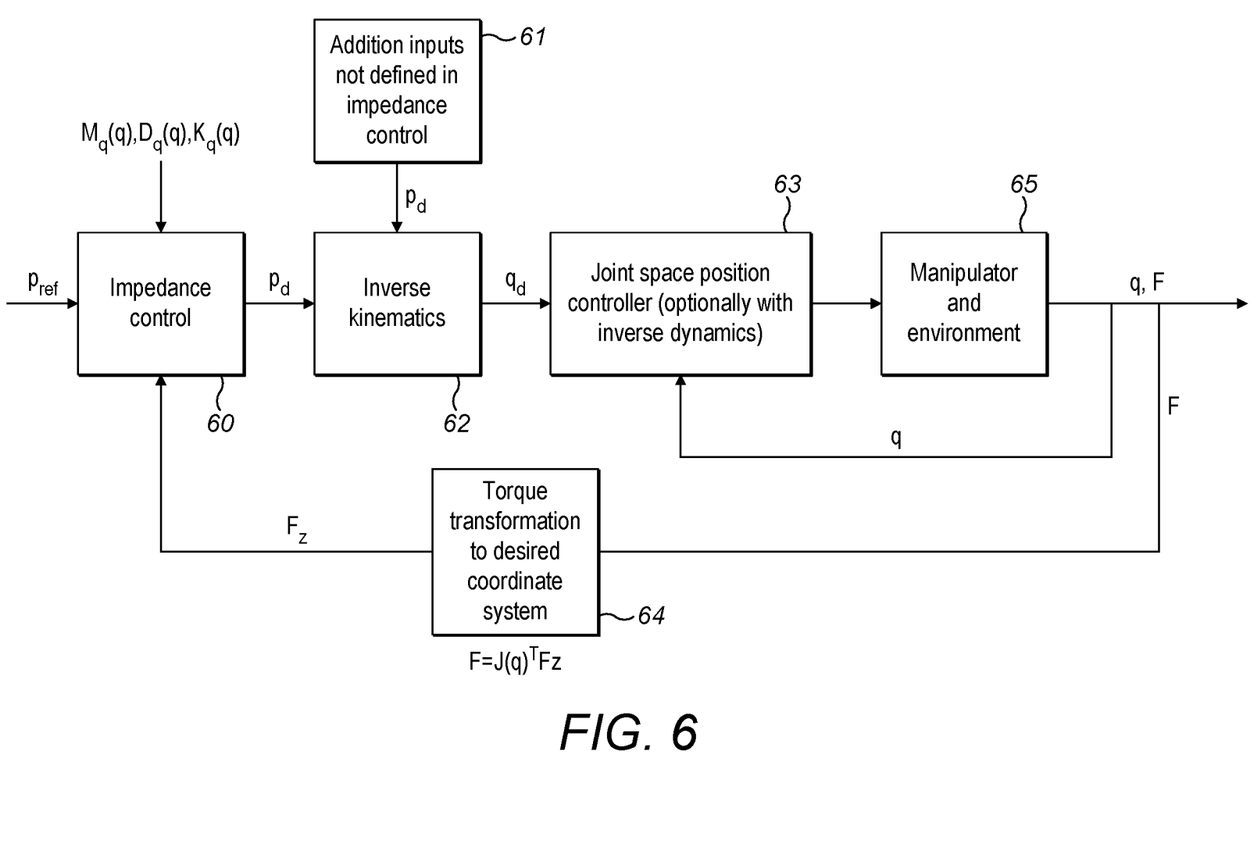
FIG. 6 is a block diagram of a second impedance control algorithm ("B").

A second control algorithm B will now be described with reference to FIG. 6.

The second control algorithm comprises the following functional blocks: an impedance control block 60, an inverse kinematics block 61, an additional input block 62, a joint space position controller block 63 and a torque transformation block 64. FIG. 6 also shows the manipulator and its environment as a block 65. Functional blocks 60 to 64 may be implemented in any suitable combination of hardware and/or software.

In general terms, the second control algorithm operates in the following way.

A reference position $p_{ref}$ which represents the base position of the end effector 11 before it has been perturbed by exogenous forces, is input to the impedance control block 60 together with the matrices $M_q(q)$, $D_q(q)$ and $K_q(q)$ and Fz, which represents the measured torques/forces on the joints transformed into the same coordinate system as $p_{ref}$ is expressed in. The impedance control block 60 implements an impedance control scheme to form a desired position $p_d$ for the end effector.

Additional position inputs may be provided from the additional input block 62. This may be used when one or more joints are to operate under position control instead of impedance control.

The inverse kinematics block 61 performs inverse kinematics to derive a set of desired joint angles $q_d$ corresponding to the complete set of $p_d$ values supplied to the block 61. These are joint angles which, when adopted by the manipulator, will result in the end effector being in the desired location.

$q_d$ is input to the joint space position controller block 63 together with q, which represents the measured positions of the joints as derived from the position sensors 20. The joint space position controller block 63 forms a set of drive outputs to the motors 23 of the arm in dependence on the difference between the desired and actual configurations of the respective joint at which that motor acts. Each drive output represents a command torque to the respective motor. The drive outputs are passed to the motors 23 of the arm to cause them to apply corresponding torques/forces to the joints of the arm. The joint space position controller could be a proportional-differential controller, or any of the alternative approaches listed above.

The torque transformation block 64 receives the torques/forces as measured by the sensors 21 on the arm and transforms them into a vector $F_Z$ which represents the information in the same coordinate system as is used for $p_{ref}$ and $p_d$. This may be done in accordance with the equation $F=J(q)^T F_Z$, where J is the Jacobian. Note that to compute $F_Z$ from F may not always be uniquely possible (i.e. $J(q)^{T-1}$ may not exist). Then logic can be provided to select an $F_Z$ from the valid candidates.

In the first control algorithm A the impedance parameters can be supplied in a coordinate system different to that in which the impedance control algorithm is implemented. In the second control algorithm B the coordinate system(s) in which $p_{ref}$ and the impedance matrices are defined can be different from the coordinate system in which the values F are measured. Conveniently $p_{ref}$ and the impedance matrices can be defined in the coordinate system in which the impedance itself is specified. In each case the said coordinate system may be a well-known coordinate system (e.g. spherical, quadraplanar, elliptic cylindrical, polar, spheroidal, orthocentric, toroidal, harmonic or Gaussian) or may be an arbitrary coordinate system defined by a parameterisation of a vector or topological space). The coordinate system may have any number of dimensions suitable to the data needed to be represented. In one example the coordinate system could be a Cartesian space, defined on three linear axes whose orientations are fixed in space. In another example the coordinate system could be a non-Cartesian system defined by parameters none of which represents a linear value on an axis whose orientation is fixed in space. By choosing an appropriate coordinate system to the required impedance characteristics the impedance definition matrices $M_p$, $D_p$, $K_p$ can, if desired, be kept constant. This can reduce the amount of computation needed to implement the algorithm. For example, if the impedance is to be synthesised on the surface of a sphere, $M_p$, $D_p$, $K_p$ could be 2×2 matrices, and the impedance control would define motion in two degrees of freedom, whilst the other four degrees of freedom would be controlled directly, e.g. from block 61.

The impedance control block 60 may compute the demanded position $p_d$ by solving the ODE for the mechanical impedance and then by setting a position demand to the inverse kinematics.

In some situations it will be convenient for the impedance matrices and $p_{ref}$ to be expressed in spherical coordinates. When spherical coordinates are being used the following can be noted:

It may be efficient for the inverse kinematics block 62 to operate partly in spherical coordinates and partly in another convenient coordinate system (e.g. a Cartesian system). A practical way to achieve this might be to specify impedances for the polar angle and azimuth angle (θ, φ), but to specify the sphere radius (ρ) and the rotary end effector positions directly. The inverse kinematics block 62 can simply convert from the specified spherical coordinates back into, the other system In the case of a spherical to Cartesian transformation the standard relationships can be used (x=ρ sin θ cos φ, y=ρ sin θ sin φ, z=ρ cos θ)

The torque transformation performed in block 64 can operate in a two-step manner. First it can convert from torques expressed in joint space to Cartesian torques by a suitable means. The example manipulator shown in FIG. 3 has eight joints, each with torque sensors. Therefore the pseudo inverse of $J(q)^T$ can be used to determine $F_Z$ from F. Letting $F_{Zx}$, $F_{Zy}$ and $F_{Zz}$ denote the x, y and z components of force acting, the forces acting in spherical coordinate can be represented as follows, using the well-known unit vectors for spherical coordinates:

$$F\theta = \cos\theta \cos\varphi Fzx + \cos\theta \sin\varphi Fzy - \sin\theta Fzz$$

$$F\varphi = -\sin\varphi Fzx + \cos\varphi Fzy$$

Using spherical coordinates is unlikely to be desirable for large polar angular values, because distance along the surface for small changes in azimuth angle tend to zero as the polar angle tends to 90 degrees.

In both algorithms A and B the loops through blocks 53/63 and 54/65 with feedback of q to block 53 may be performed asynchronously from the generation of $q_d$. For example that feedback loop may be performed at higher frequency than the generation of $q_d$.

The control unit 22 may be capable of implementing either or both of the first and second control algorithms A, B. It may configured so as to select whether to apply the first or second algorithm in dependence on the operation of the manipulator. The first control algorithm is particularly convenient for use when the required impedance behaviour maps closely to the reference frame of the end effector, for example when the impedance can be readily expressed in Cartesian x, y, z coordinates and rotary degrees of freedom. The second control algorithm is particularly convenient for use when the required impedance behaviour does not map closely to the reference frame of the end effector, for example when the impedance is defined for movements of the end effector on an arbitrary N dimensional coordinate system, such as the surface of a sphere. Considerations that may influence the choice of algorithm include testability, computational complexity and clarity of presentation.

In each of algorithms A and B the torque/force signals F received from the torque/force sensors 20, 21 at the joints of the manipulator may be conditioned before being used in other parts of the respective algorithm. For example, they may be adjusted by subtracting force modelled in dependence on the current pose of the arm to substantially cancel the effect of gravity and/or inertial torque/forces from the measured forces/torques, they may be filtered to remove noise and/or they may be processed to remove measurement offset.

Impedance control in accordance with the algorithms A and B described above can be useful in control systems for driven articulated mechanical systems where it is necessary for the mechanical system to interact with the environment in a controlled manner. The impedance can be defined to provide any required physical impedance behaviour. For example it may be advantageous for a robotic manipulator's end effector to appear springy to a user interacting with it. In this case the desired behaviour of the end effector position is one which the position is linearly proportional to the exogenous force applied at the end effector. This can be defined by means of the impedance matrices. In general, the impedance matrices may permit an arbitrary mechanical impedance (that is an arbitrary relationship between torque/force and position) to be defined. The impedance may be defined in any suitable vector space, with any suitable number of dimensions. The impedance may be defined for any position along the robotic manipulator.

In algorithms A and B the joint space position controller blocks may optionally perform inverse dynamics.

It will be noted that the algorithms A and B as described above do not require calculations to be made to attempt to compensate for uncertainty in the actual applied torques/forces. Instead, the algorithms form their outputs in dependence on measured joint configurations and measured torques/forces. This can be simpler and more accurate than some prior approaches.

In algorithms A and B the inverse kinematics problem is kept separate from the position control loop. One potential advantage of this is that the problem of arm position control in joint space can be separated from, and solved and optimised independently of, the inverse kinematics problem. Another potential advantage of this is that the inverse kinematics approach can be independently developed. In the case of redundant serial manipulators (such as that of FIG. 3), the redundancy can be resolved without impacting on the inner position control loop. This can improve the safety and the control accuracy of the manipulator.

As described above, the impedances can be defined in an arbitrary coordinate system. Then in one or more degrees of freedom the manipulator may operate under impedance control, while in the remaining degree(s) of freedom the manipulator may operate under position control.

Unlike some prior art approaches algorithms A and B do not require a dedicated torque/force sensor at the end effector, although such a sensor could be used.

Algorithms A and B are particularly suitable for use when the joints are driven with high gear ratios. High gear ratios are often advantageous because they can deliver a good highest power/volume ratio. In joints which are directly driven by electric motors, it is often feasible to determine the torque/force delivered by a joint by from an examination of the current through its drive motor. This is because most electric motors have a well-defined current-torque relationship. However, due to drive-train frictional losses at high (e.g. 1:100 or more) gear ratios, it can be difficult to estimate the joint output torque from measurement of the motor-side torque in high ratio drives. Instead, torque sensors can be incorporated at or in the final output bearing or linkage of each joint. This can avoid the need to estimate joint torques from motor-side quantities. In addition the presence of torque sensors within each joint can negate the need for a force/torque sensor at the end effector.

The robot or manipulator could be for any suitable purpose. For example, it could be an industrial robot or a surgical robot. In the case of a surgical robot the end effector could be a surgical tool such as a scalpel, surgical cutter, surgical pincer or cauteriser.

The joints could be driven by electric motors, which could be rotary or linear, or by other means such as hydraulic or pneumatic actuators. These would be driven from the same control algorithms.

In the description above algorithms A and B have been split into functional blocks for ease of explanation. In practice, two or more of these blocks could be architecturally combined.

Algorithms A and B as described above could be applied to robots or manipulators of any suitable form. They are not limited to arms of the type shown in FIG. 3. The methods could be used to control manipulators that are configured in ways other than with arms: for example machining tables. The methods could be used to control other mechanical devices with interlinked parts that can be driven to move relative to each other, such as crane or excavator arms, vehicle suspension systems and movable aircraft flight surface elements.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the invention.

The invention claimed is:

1. A method of controlling a mechanical system having a plurality of components interlinked by a plurality of driven joints, the method comprising:
    measuring the torques or forces about or at the driven joints and forming a load signal representing the measured torques or forces;
    receiving a motion demand signal representing a desired state of the system;
    implementing an impedance control algorithm, comprising solving an ordinary differential equation which has inputs of the motion demand signal and the load signal, to form a target signal indicating a target configuration for each of the driven joints;
    measuring the configuration of each of the driven joints and forming a state signal representing the measured configurations; and
    forming a set of drive signals for the joints by, for each joint, comparing the target configuration of that joint as indicated by the target signal to the measured configuration of that joint as indicated by the state signal.

2. A method as claimed in claim 1, comprising driving each of the driven joints in dependence on the respective drive signal.

3. A method as claimed in claim 2, wherein each of the driven joints is provided with a respective electric motor configured to drive motion at the joint and each drive signal is applied to the respective electric motor.

4. A method as claimed in claim 2, comprising repeatedly performing the second measuring step, the forming step and the driving step.

5. A method as claimed in claim 4, wherein the step of forming the set of drive signals is performed at higher frequency than the step of forming the target signal.

6. A method as claimed in claim 1, wherein implementing the impedance control algorithm comprises solving the ordinary differential equation from inputs of, for each driven joint, a respective mass, damper and spring term.

7. A method as claimed in claim 1, wherein the motion demand signal represents a desired configuration for each of the driven joints.

8. A method as claimed in claim 7, comprising:
receiving a primary motion demand signal representing a desired physical position of a part of the mechanical system;
performing an inverse kinematic computation to determine a configuration for each of the driven joints that would position the part of the mechanical system at the desired physical position; and
providing the determined configurations as the motion demand signal.

9. A method as claimed in claim 6, comprising:
receiving data representing desired impedance characteristics for the physical system in a first coordinate space; and
converting that data to, for each driven joint, a respective mass, damper and spring term.

10. A method as claimed in claim 9, wherein the first coordinate space is a non-Cartesian coordinate space, a topological space or a vector space.

11. A method as claimed in claim 1, wherein the impedance control algorithm is implemented in joint space.

12. A method as claimed in claim 1, wherein the motion demand signal represents a desired physical position of a part of the mechanical system.

13. A method as claimed in claim 12, wherein the said step of implementing the impedance control algorithm comprises:
solving the ordinary differential equation to determine a target physical position of the part of the mechanical system;
performing an inverse kinematic computation to determine a configuration for each of the driven joints that is suitable for positioning the part of the mechanical system at the target physical position; and
forming the target signal as indicating those configurations as the target configurations for the driven joints.

14. A method as claimed in claim 13, comprising:
specifying information indicating a desired configuration of the mechanical system; and
the step of performing an inverse kinematic computation is performed so as to determine a configuration for each of the driven joints that is suitable for positioning the part of the mechanical system at the target physical position and satisfying the desired configuration indicated by the information.

15. A method as claimed in claim 1, comprising converting the measured torques or forces about or at the driven joints to a first coordinate space different from the space in which the torques or forces were measured so as to form the load signal.

16. A method as claimed in claim 15, wherein the first coordinate space is a non-Cartesian space, a topological space or a vector space.

17. A method as claimed in claim 1, wherein the mechanical system is a robot manipulator or a surgical robot.

18. A controller for a mechanical system, the controller being configured to perform a method comprising:
measuring the torques or forces about or at the driven joints and forming a load signal representing the measured torques or forces; receiving a motion demand signal representing a desired state of the system;
implementing an impedance control algorithm, comprising solving an ordinary differential equation which has inputs of the motion demand signal and the load signal, to form a target signal indicating a target configuration for each of the driven joints;
measuring the configuration of each of the driven joints and forming a state signal representing the measured configurations; and
forming a set of drive signals for the joints by, for each joint, comparing the target configuration of that joint as indicated by the target signal to the measured configuration of that joint as indicated by the state signal.

19. A robot manipulator comprising the controller as claimed in claim 18, the manipulator further comprising a plurality of components interlinked by a plurality of driven joints, wherein the controller is configured to control the manipulator by the method of 21.

20. A non-transitory computer readable storage medium having stored thereon computer readable instructions that, when executed at a computer system, cause the computer system to perform a method for controlling a mechanical system having a plurality of components interlinked by a plurality of driven joints, wherein the method comprises:
measuring the torques or forces about or at the driven joints and forming a load signal representing the measured torques or forces;
receiving a motion demand signal representing a desired state of the system; implementing an impedance control algorithm, comprising solving an ordinary differential equation which has inputs of the motion demand signal and the load signal, to form a target signal indicating a target configuration for each of the driven joints;
measuring the configuration of each of the driven joints and forming a state signal representing the measured configurations; and
forming a set of drive signals for the joints by, for each joint, comparing the target configuration of that joint as indicated by the target signal to the measured configuration of that joint as indicated by the state signal.

21. A method as claimed in claim 1, wherein implementing the impedance control algorithm comprises solving an ordinary differential equation which has inputs of only the motion demand signal, the load signal and impedance parameters, the impedance parameters comprising mass, damper and spring terms.

* * * * *